United States Patent [19]
Gotou

[11] 4,359,674
[45] Nov. 16, 1982

[54] CONTROL SYSTEM FOR A DC MOTOR
[75] Inventor: Makoto Gotou, Kadoma, Japan
[73] Assignee: Matsushita Electric Industrial Co., Ltd., Osaka, Japan
[21] Appl. No.: 123,473
[22] Filed: Feb. 21, 1980
[30] Foreign Application Priority Data Feb. 22, 1979 [JP] Japan .................................. 54-20460
Mar. 6, 1979 [JP] Japan .................................. 54-26385

[51] Int. Cl.³ ............................................. H02P 5/16
[52] U.S. Cl. ..................................... 318/318; 318/341
[58] Field of Search ............... 323/266, 271, 282, 290, 323/351; 318/341, 345, 138

[56] References Cited
U.S. PATENT DOCUMENTS

| | | | |
|---|---|---|---|
| 3,373,344 | 3/1968 | Seer | 323/266 |
| 3,600,658 | 8/1971 | Kuniyoshi | 318/138 |
| 3,896,348 | 7/1975 | Loderer | 318/138 |
| 4,088,932 | 5/1978 | Okuyama et al. | 318/138 |

Primary Examiner—J. V. Truhe
Assistant Examiner—Richard M. Moose
Attorney, Agent, or Firm—Wenderoth, Lind & Ponack

[57] ABSTRACT

A control system for a DC motor controlling the supply of power to polyphase coils by a drive transistor has a DC-DC switching converter for changing an output voltage according to an on-time ratio of the switching semiconductor, and a voltage controller for detecting a voltage drop across the drive transistor and for controlling the on-time ratio of the switching semiconductor so that the voltage drop across the drive transistor may be a predetermined small value. Therefore, the control system for a DC motor has a high power efficiency but reduced noise in the polyphase coils because of the operation of the DC-DC switching converter and the voltage controller. Furthermore, the control system for a DC motor can precisely control the supply of power to the polyphase coils by the drive transistor.

4 Claims, 7 Drawing Figures

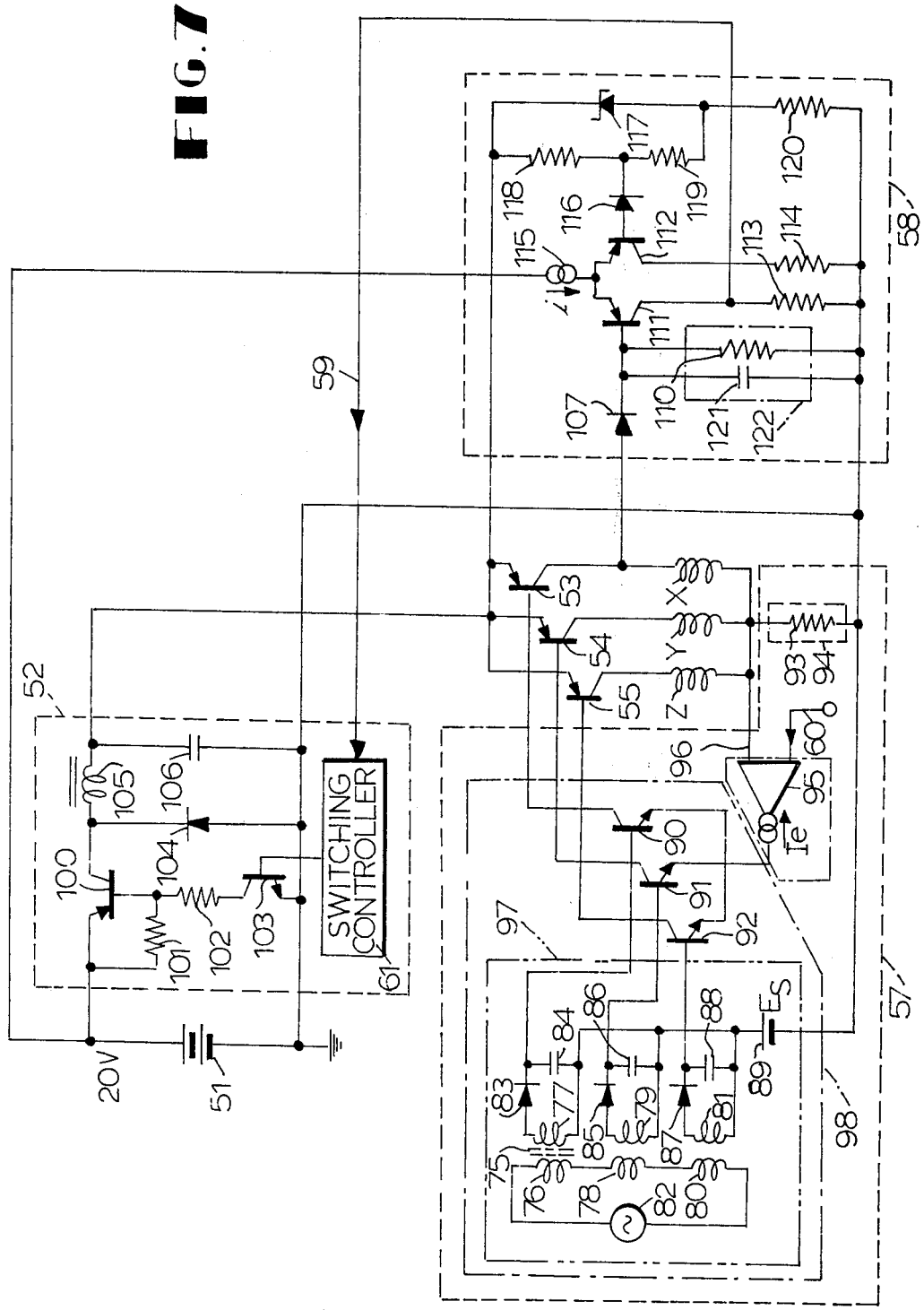

CONTROL SYSTEM FOR A DC MOTOR

BACKGROUND OF THE INVENTION

This invention relates to a control system for a DC motor, particularly to a system having a DC-DC switching converter.

In a conventional system, when controlling the rotational speed of a DC motor, a drive transistor is used to supply the DC motor with a controlled voltage from a DC voltage source. The drive transistor controls the electrical power to the DC motor by changing the voltage drop between the collector and emitter terminals. In this case, the supplied power from the DC voltage source is the sum of the effective power in the DC motor and the power loss (the collector loss) of the drive transistor. The power loss of the drive transistor is generally larger than the effective power in the DC motor. Accordingly, the power efficiency, defined as the percent ratio of the effective power supplied to the DC motor to the total power supplied from the DC voltage source, is rather small, for example, 10% to 30%. Particularly, in a control system for a DC motor having a wide range of outputs in rotational speed or torque), the power efficiency becomes remarkably small at low outputs (i.e. low speed or low torque).

In the prior art, there is proposed a pulse drive system for a DC motor energizing motor coils impulsively in order to improve the power efficiency. (For example, U.S. Pat. No. 4,051,417 discloses a pulse drive system for a brushless DC motor.)

Inflicting high frequency voltage pulses on the inductive coils causes the pulse drive system for a DC motor to have the following defects:

(1) Sharp reactive pulses occur at the motor coils so that a ripple of the supply current and a vibration of the motor are induced.

(2) Switching transistors may be destroyed by the reactive pulses.

(3) The pulses of voltage produce harmful electromagnetic waves in the motor coils, which induce noise in other audio apparatus.

(4) A large electromagnetic shield over the motor coils is necessary in order to equip the pulse drive system in an audio apparatus.

SUMMARY OF THE INVENTION

Accordingly, an object of the present invention is to provide an excellent system for controlling a DC motor and having a high power efficiency with reduced noise.

It is another object of the present invention to provide an excellent control system suitable for a brushless DC motor and having a high power efficiency with greatly reduced noise.

These objects are achieved according to the present invention by providing DC-DC switching converter and a voltage controller for controlling the output voltage of said DC-DC switching converter so that the voltage drop across the drive transistor may be a predetermined small value.

BRIEF DESCRIPTION OF THE DRAWINGS

These and other objects, features and advantages of the present invention will become more apparent from the following description with the accompanying drawings which show several embodiments according to the present invention, wherein:

FIG. 7 is another circuit diagram for the brushless DC motor shown in FIG. 5 and representing another embodiment of the present invention according to the basic block diagram shown in FIG. 4.

DESCRIPTION OF THE PREFERRED EMBODIMENTS

Figure 1:
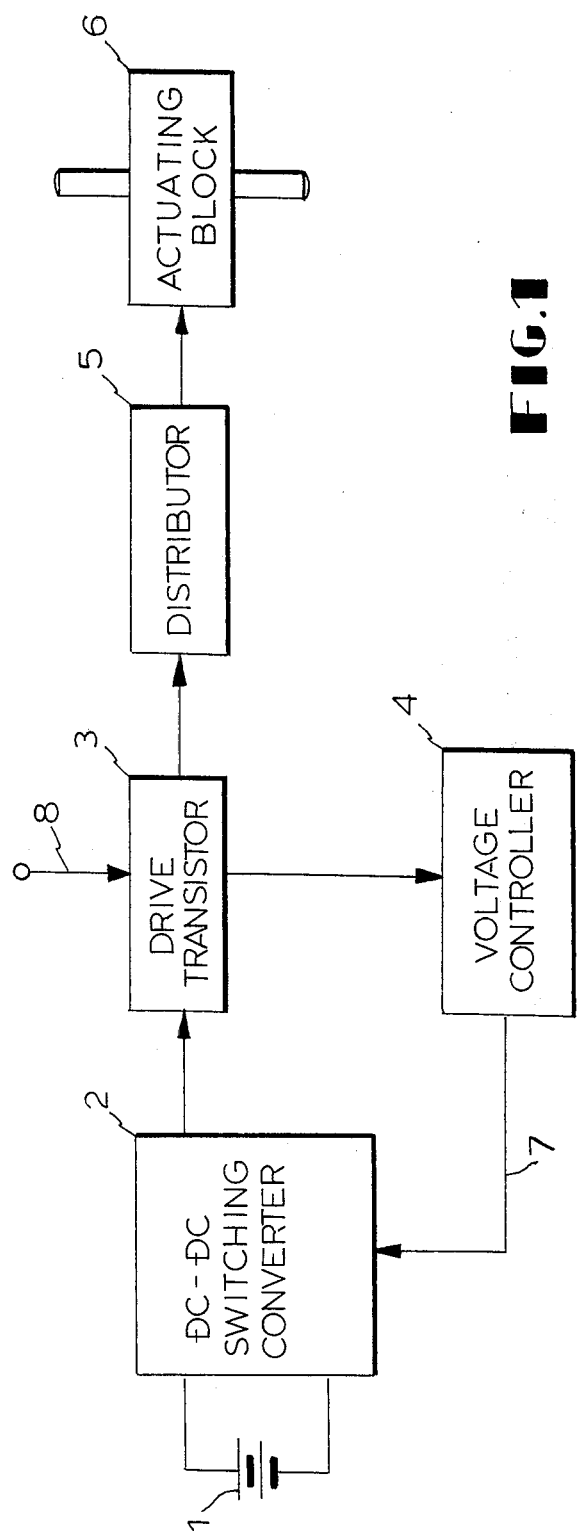
FIG. 1 is a basic block diagram of a control system for a DC motor according to the present invention.

Referring now to FIG. 1, which is a basic block diagram of a control system for a DC motor according to the present invention, a DC-DC switching converter 2 is coupled to a DC voltage source 1. A drive transistor 3 is intervened in the current path from the DC-DC switching converter 2 to a distributor 5 and an actuating block 6. A voltage controller 4 is coupled to the drive transistor 3 and controls the DC-DC switching converter 2. Besides, reference numeral 7 is a detected signal of the voltage controller 4 applied to the DC-DC switching converter 2, and reference numeral 8 is a control signal to the drive transistor 3.

The DC-DC switching converter 2, comprising a switching semiconductor, an inductor, a flywheel diode and a capacitor, for example, produces another DC voltage from the DC voltage source 1 by the chopping action of the switching semiconductor. The output voltage of the DC-DC switching converter 2 can be controlled in a wide voltage range in correspondence with the on-time ratio of the switching semiconductor, defined as the ratio of on-time to one cyclic time. A bipolar transistor, a field effect transistor, a thyristor, etc. can be used as the switching semiconductor. The actuation block 6 is supplied with an electrical power from the DC-DC switching converter 2 through the drive transistor 3 and the distributor 5.

Considering that the control signal 8 is corresponding to the rotational speed error of the actuating block 6 between the acutal speed and the desired speed, the drive transistor 3 changes the voltage drop precisely so as to control the supply voltage to the distributor 5 and the actuating block 6 according to the control signal 8. Thus, the precise control of the rotational speed can be achieved by the precise operation of the drive transistor 3.

A bipolar transistor or a field effect transistor is used as the drive transistor 3. In general, the drive transistor in the present invention is meant to be a transistor having at least 3 terminals (i.e. input, output and control), and being able to change the voltage drop between the input and output terminals continuously according to the signal at the control terminal.

The voltage controller 4 detects the voltage drop across the drive transistor 3 and provides the detected signal 7 to the DC-DC switching converter 2. The DC-DC switching converter 2 changes the output voltage according to the detected signal 7 by controlling the on-time ratio of the switching semiconductor, so that the voltage drop across the drive transistor 3 may be a predetermined small value in the normal operating region.

Therefore, the drive transistor 3 is always operating actively with only a small voltage drop which is independent of the supply voltage to the actuating block 6. The normal operating region is called the active region between saturation and breakdown for a bipolar transistor or the saturation region between pinch-off and breakdown for a field effect transistor. In general, the normal operating region is the region where the transistor can control its voltage drop continuously with a fixed input voltage according to the control signal at the control terminal.

The actuating block 6 has a permanent magnet having a plurality of N and S poles and polyphase coils provided in the magnetic field of the permanent magnet so as to generate polyphase alternate voltages according to the relative rotation between them. The permanent magnet and the polyphase coils are rotatable relative to each other. The distributor 5 is a mechanical brush commutator or an electronic commutator comprising a position detecting means and semiconductor switches. As the distributor 5 selects the current paths to the polyphase coils according to the relative position between the permanent magnet and the polyphase coils, a continuous drive torque is obtained at the actuating block 6.

As described above, the drive transistor 3 has maintained its normal operation with a small voltage drop, independent of the supply voltage to the actuating block 6, by controlling the output voltage of the DC-DC switching converter 2. Thus, the power dissipation at the drive transistor 3 remains small, as compared with the effective power to the actuating block 6. The power loss in the DC-DC switching converter 2 is also small because of the switching conversion. Thus, the control system for a DC motor shown in FIG. 1 has a remarkably improved power efficiency with reduced noise.

Figure 2:
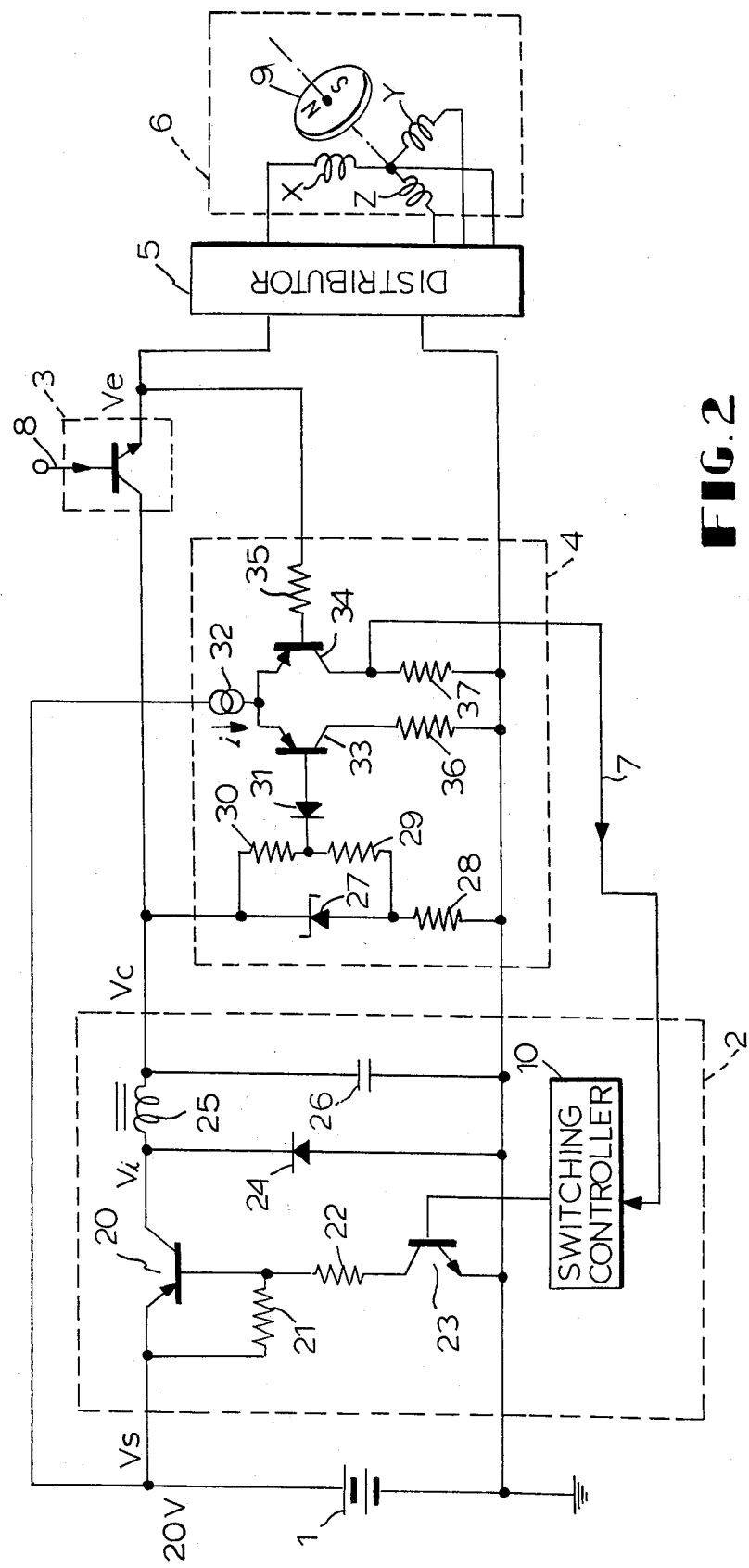
FIG. 2 shows an embodiment of the present invention according to the basic block diagram shown in FIG. 1.

FIG. 2 shows an embodiment of the present invention according to the basic block diagram shown in FIG. 1. In FIG. 2, same reference numerals as shown in FIG. 1 represent elements having the same functions explained hereinbefore. The DC-DC switching converter 2 can change the output voltage $V_c$ corresponding to on-time ratio of the switching transistor 20 connected in series with the DC voltage source 1 ($V_s=20$ V).

When the switching transistor 20 turns on, $V_i \approx V_s$, and the DC voltage source 1 supplies electrical power to an inductor 25, a capacitor 26 and the drive transistor 3. When the switching transistor 20 turns off, $V_i \approx 0$, and a flywheel diode 24 turns on, and the inductive energy stored in the inductor 25 is released to the drive transistor 3. The capacitor 26 reduces ripples in the output voltage $V_c$ of the DC-DC switching converter 2. Thus, the DC-DC switching converter 2 changes the output $V_c$ according to the on-time ratio of the switching transistor 20. The switching transistor 20 can be held on when the maximum output is needed. Besides, reference numeral 10 is a switching controller for controlling the on-time ratio of the switching transistor 20.

The drive transistor 3 supplies the distributor 5 and the actuating block 6 with the output voltage $V_e$ corresponding to the control signal 8. The voltage drop ($V_c - V_e$) across the drive transistor 3 is detected by the voltage controller 4.

A Zener diode 27, resistors 28, 29, 30 and a diode 31 produce another voltage from the output $V_c$ of the DC-DC switching converter 2. The produced voltage is smaller than the output $V_c$ by a predetermined voltage $V_a$, and usually $V_a \approx 0.5$ V to 5 V. The voltage difference ($V_c - V_a$) is applied to the base terminal of a transistor 33.

On the other hand, the supply voltage $V_e$ to the distributor 5 is applied to the base terminal of a transistor 34 through a resistor 35. The transistors 33 and 34 form a differential circuit which compares the base voltages ($V_c - V_a$) and $V_e$. Therefore, the detected signal 7, corresponding to the difference voltage $[(V_c - V_e) - V_a]$ between the voltage drop ($V_c - V_e$) across the drive transistor 3 and the predetermined voltage $V_a$, is obtained at the collector resistor 37 of the transistor 34.

The detected signal 7 is applied to the switching controller 10 in the DC-DC switching converter 2. The switching controller 10 comprises an oscillator, a sawtooth wave generator and a comparator, and produces a pulse train with a pulse width corresponding to the detected signal 7, for example. The switching controller 10 controls the on-time ratio of the switching transistor 20 according to the detected signal 7, and changes the output voltage $V_c$ of the DC-DC switching converter 2 so that the voltage drop ($V_c - V_e$) across the drive transistor 3 can be equal to the predetermined value $V_a$.

Besides, reference numeral 31 in the voltage controller 4 is a diode for a reverse voltage protection of the transistor 33, and reference numeral 32 is a constant current source from the DC voltage source 1.

The actuating block 6 comprises three-phase coils X, Y and Z and a permanent magnet 9 having N and S poles, which are rotatable relative to each other.

The distributor 5 distributes the output current of the drive transistor 3 to the three-phase coils X, Y and Z according to the relative position between the coils and the magnet 9, so that a continuous drive torque is obtained. The distributor 5 can be a mechanical brush and commutator so as to rotate the coil block (coils X, Y and Z) against the permanent magnet 9. Also, the distributor 5 can be an electronic commutator having a position detecting means and semiconductor switches so as to rotate the permanent magnet 9.

Figure 3:
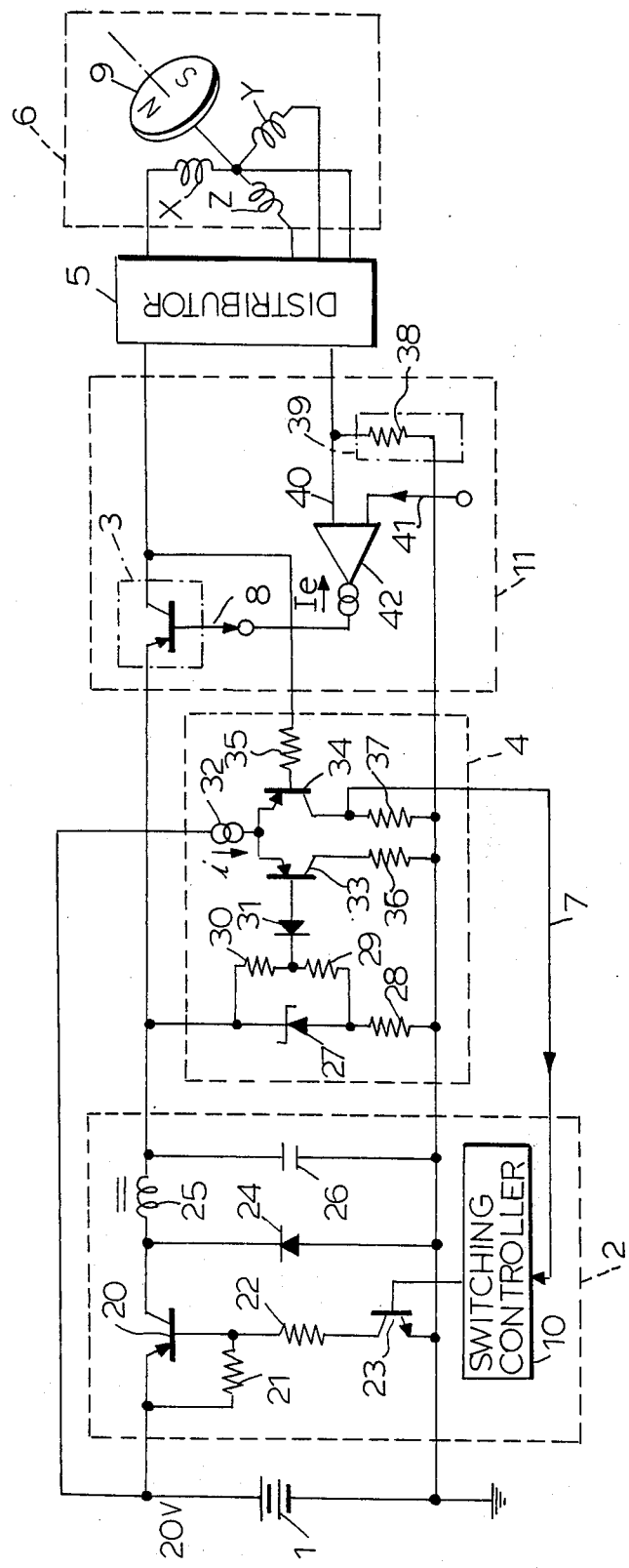
FIG. 3 shows another embodiment of the present invention according to the basic block diagram shown in FIG. 1.

FIG. 3 shows another embodiment of the present invention according to the basic block diagram shown in FIG. 1. In FIG. 3, same reference numerals as shown in FIG. 2 represent the elements having the same functions as explained in the preceding description, so the details described before are abbreviated. The embodiment shown in FIG. 3 is an improved one over the preceding embodiment so as to supply the actuating block 6 with the current corresponding to a command signal 41.

The supply controller 11 comprises the drive transistor 3, a current detector 39, a command signal 41 and a current controller 42. The current detector 39 comprises a resistor 38 connected in the current path, and detects the supply current to the actuating block 6. The command signal 41 and the detected current signal 40 from the current detector 39 are applied to the current controller 42, and the current controller 42 receives current $I_e$ in correspondence with the difference between the command signal 41 and the detected current signal 40.

As the current $I_e$ is the base current of the drive transistor 3, the supply current to the actuating block 6 is controlled by the output current $I_e$ of the current controller 42. Thus, on account of the current feedback loop comprising the drive transistor 3, the current detector 39 and the current controller 42, the supply current to the actuating block 6 corresponds to the command signal 41 so as to reduce the torque variation and improve the control stability.

Figure 4:
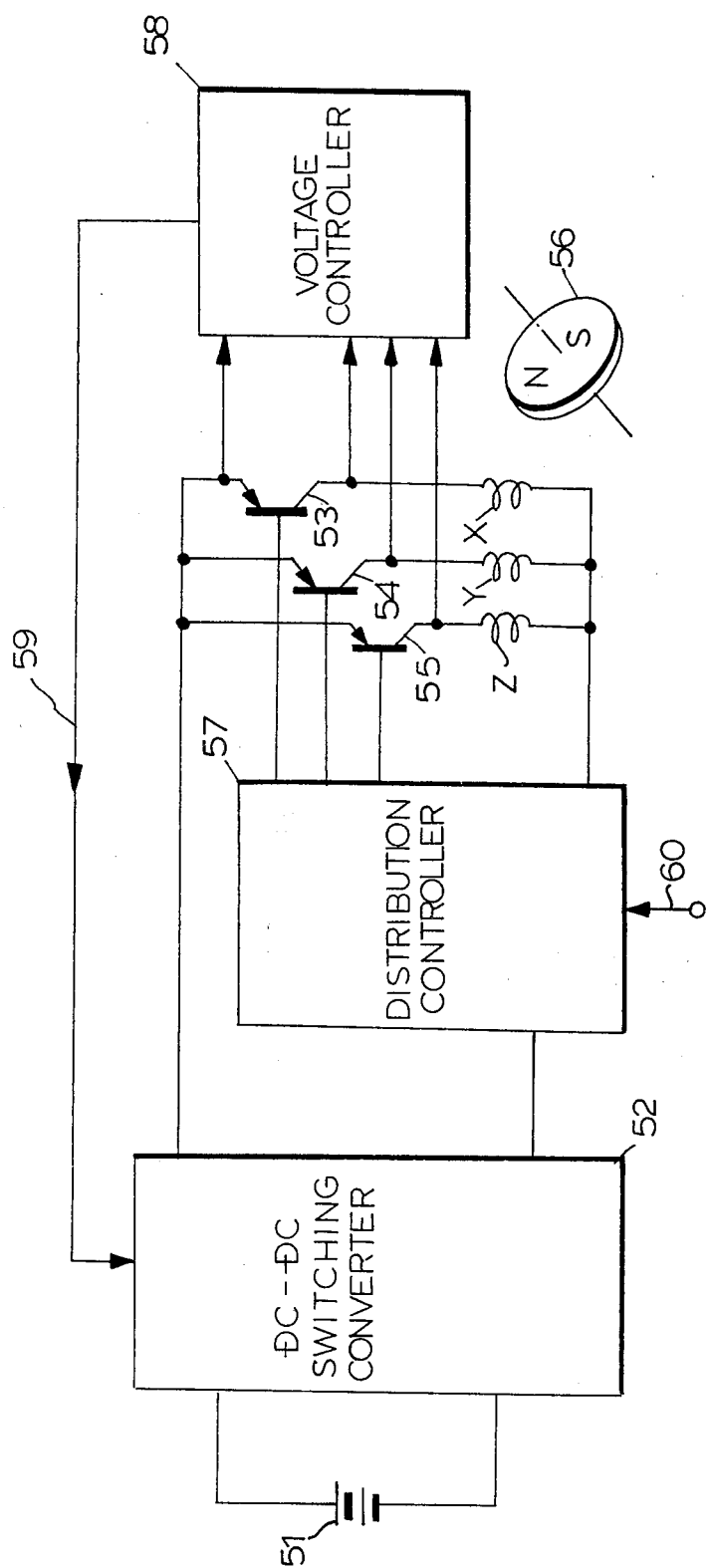
FIG. 4 is another basic block diagram of a control system suitable for a brushless DC motor according to the present invention.

Next, a control system suitable for a brushless DC motor according to the present invention will be described. FIG. 4 is a basic block diagram of the control system. In FIG. 4, a DC-DC switching converter 52 is coupled to a DC voltage source 51. Drive transistors 53, 54 and 55 are intervened in the current paths from the DC-DC switching converter 52 to three-phase stator coils X, Y and Z respectively. A permanent magnet rotor 56 rotates against the stator coils X, Y and Z. The drive transistors 53, 54 and 55 are activated by a distribution controller 57 according to the relative position between the stator coils X, Y and Z and the permanent magnet rotor 56. A voltage controller 58 is coupled to the drive transistors 53, 54 and 55, and controls the DC-DC switching converter 52.

Besides, reference numeral 59 is a detected signal of the voltage controller 58 and is applied to the DC-DC switching converter 52, and reference numeral 60 is a command signal which is supplied to the distribution controller 57.

The DC-DC switching converter 52, comprising a switching semiconductor, an inductor, a flywheel diode and a capacitor, for example, produces another DC voltage from the DC voltage source 51 by the chopping action of the switching semiconductor. A bipolar transistor, field effect transistor, a thyristor, etc, can be used as the switching semiconductor. The output voltage of the DC-DC switching converter 52 can be controlled in a wide voltage range in correspondence with the on-time ratio of the switching semiconductor, and is distributed to the stator coils X, Y and Z by the drive transistors 53, 54 and 55.

The distribution controller 57 has a position detecting means for detecting the relative position between the permanent magnet rotor 56 and the stator coils X, Y and Z, and activates the drive transistors 53, 54 and 55 sequentially by the outputs of the position detecting means so as to obtain a continuous torque for the rotation of the permanent magnet rotor 56.

Considering that the command signal 60 applied to the distribution controller 57 corresponds to the rotational speed error of the permanent magnet rotor 56 between the actual speed and the desired speed, the distribution controller 57 controls the supply current to the stator coils X, Y and Z according to the command signal 60 by precisely changing the voltage drops across the drive transistors 53, 54 and 55 in each activated period. Thus, the precise control of the rotational speed can be achieved by the precise operation of the drive transistors 53, 54 and 55. Not only are bipolar transistors usable as drive transistors, but also field effect transistors are usable as drive transistors.

The voltage controller 58 detects at least one of the voltage drops across the drive transistors 53, 54 and 55, and provides the detected signal 59 to the DC-DC switching converter 52. The DC-DC switching converter 52 changes the output voltage according to the detected signal 59 by controlling the on-time ratio of the switching semiconductor, so that the voltage drops across the drive transistors 53, 54 and 55 in each activated period may be a predetermined small value in the normal operating region. Therefore, each drive transistor in its activated period is always operating actively only with a small voltage drop, independent of the supply voltage to the corresponding stator coil.

Thus, the power dissipation of the drive transistors 53, 54 and 55 remains small, as compared with the effective power to the stator coils X, Y and Z. The power loss in the DC-DC switching converter 52 is also small because of the switching conversion.

Thus, the control system for a DC motor shown in FIG. 4 has a remarkably improved power efficiency with reduced noise.

Figure 5:
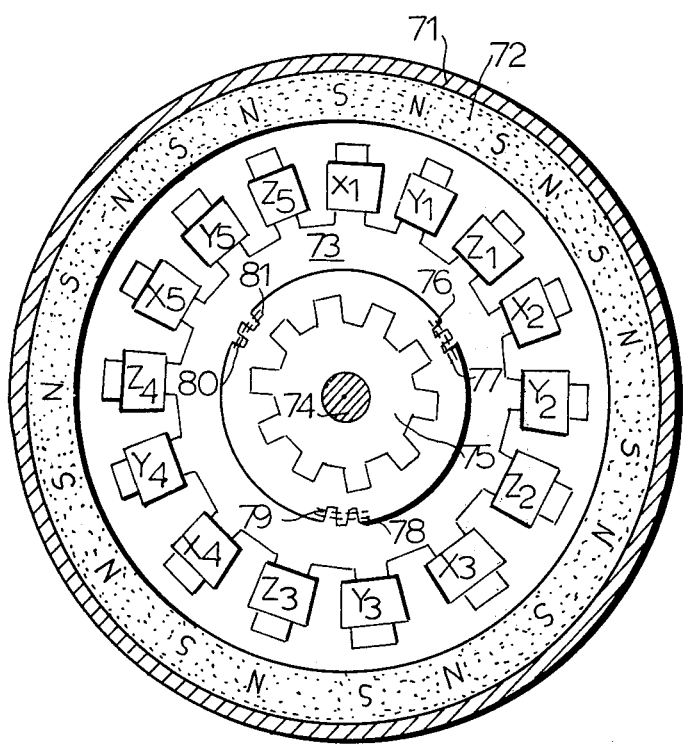
FIG. 5 is a schematic sectional view of a known mechanical construction of a brushless DC motor for use in the explanation of the present invention.
Figure 6:
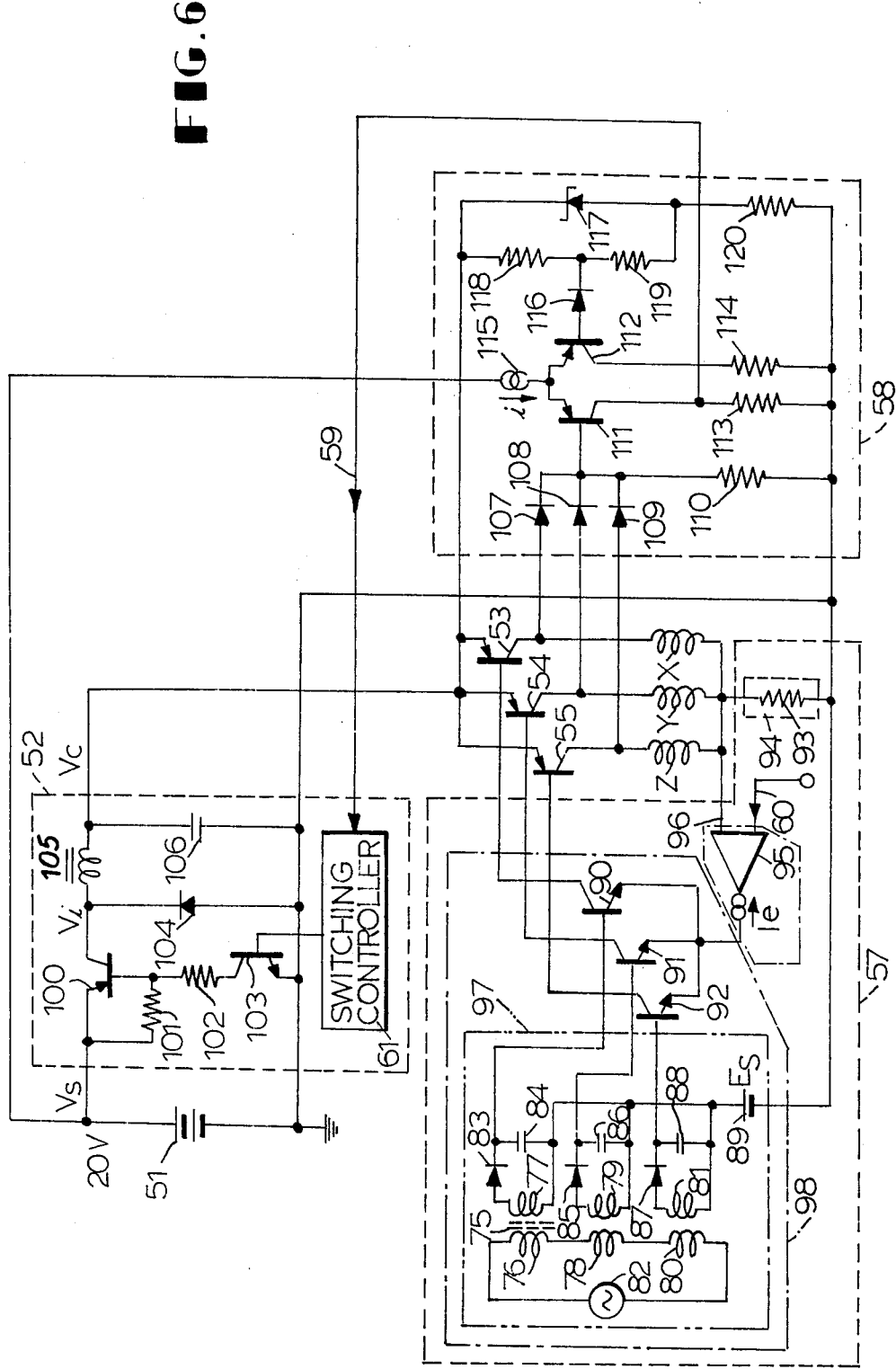
FIG. 6 is a circuit diagram for the brushless DC motor shown in FIG. 5 and representing an embodiment of the present invention according to the basic block diagram shown in FIG. 4.

FIG. 5 and FIG. 6 represent an embodiment of the present invention according to the basic block diagram shown in FIG. 4. FIG. 5 is a schematic sectional view of a known mechanical construction of a brushless DC motor, and FIG. 6 is a circuit diagram for the brushless DC motor shown in FIG. 5.

First, the mechanical construction of the brushless DC motor shown in FIG. 5 will be described. A rotor 71 has a cylindrical permanent magnet rotor 72 providing ten pole pairs of N and S poles on the inner periphery, and a stator armature core 73 has fifteen salient poles facing the poles of the permanent magnet rotor 72. The permanent magnet rotor 72 is rotatably fixed to the stator armature core 73.

Stator coils $X_1, Y_1, Z_1, \ldots, X_5, Y_5$ and $Z_5$ are wound on the salient poles of the armature core 73, respectively. The coils $X_i$, i=1 to 5, connected in series form a stator coil X as shown in FIG. 4, the coils $Y_i$, i=1 to 5, form a stator coil Y, and the coils $Z_i$, i=1 to 5, form a stator coil Z. These three-phase stator coils X, Y and Z are connected in a star connection.

Position detecting rotor 75, fixed to the rotary axis 74 of the rotor 71, provides ten salient portions in correspondence with the number of the pole pairs of the permanent magnet rotor 72. The position detecting rotor 75 rotates, facing the pairs of the saliencies of the armature core 73 which provide the energized coils 76, 78 and 80 coupled to a high frequency oscillator, and detecting coils 77, 79 and 81.

The mutual coupling between each coil pair comprising an energized coil and a detecting coil changes according to the position of the position detecting rotor 75, so that the signal of each detecting coil corresponds to the relative position between the permanent magnet rotor 72 and the stator coils X, Y and Z.

Next, the construction of the circuit diagram shown in FIG. 6 will be described. In FIG. 6, the distribution controller 57 comprises: a position detecting means 98 for detecting the relative position between the permanent magnet rotor 72 and the stator coils X, Y and Z, and for activating the drive transistors 53, 54 and 55 corresponding to the relative position; a current detector 94 for detecting the supply current to the three-phase stator coils X, Y and Z; and a current controller 95 for controlling the conductivities of the drive transistors 53, 54 and 55 so as to supply the stator coils X, Y and Z with a current corresponding to the command signal 60. The position detecting means 98 comprises a detecting portion 97 for producing position signals and a group of the differential transistors 90, 91 and 92 for activating the drive transistors 53, 54 and 55 according to the position signals from the detecting portion 97.

The DC-DC switching converter 52 comprises a switching controller 61, a switching transistor 100, bias resistors 101 and 102, a transistor 103, a flywheel diode 104, an inductor 105 and a capacitor 106. The voltage controller 58 comprises diodes 107, 108 and 109 for detecting voltage drops across the drive transistors 53, 54 and 55, a resistor 110 for providing the current path of the diodes 107, 108 and 109, differential transistors 111 and 112, collector resistors 113 and 114, a constant current source 115, a diode 116, a Zener diode 117, and resistors 118, 119 and 120.

The operation of the circuit diagram shown in FIG. 6 will be described in detail. The DC-DC switching converter 52 can change the output voltage $V_c$ in correspondence with the on-time ratio of the switching transistor 100 connected in series with the DC voltage source 51 ($V_s = 20$ V). When the switching transistor 100 turns on, $V_i \approx V_s$, and the DC voltage source 51 supplies electrical power to the inductor 105, the capacitor 106 and the drive transistors 53, 54 and 55. When the switching transistor 100 turns off, $V_i \approx 0$, and the flywheel diode 104 turns on, and the inductive energy stored in the inductor 105 is released to the drive transistors 53, 54 and 55. The capacitor 106 reduces ripples in the output voltage $V_c$ of the DC-DC switching converter 52. Thus, the DC-DC switching converter 52 changes the output voltage $V_c$ in accordance with the on-time ratio of the switching transistor 100. The switching transistor 100 can be held on when the maximum output is needed.

The drive transistors 53, 54 and 55, and the distribution controller 57 supply the stator coils X, Y and Z with the current corresponding to the command signal 60. The energized coils 76, 78 and 80 are supplied with a frequency signal of 50 KHz from the oscillator 82. As the mutual inductance between each pair of the energized coil and the detecting coil changes with a change of the position of the position detecting rotor 75, the detecting coils 77, 79 and 81 obtain three-phase amplitude modulated signals, each amplitude of which changes with a change of the position of the position detecting rotor 75.

The AM frequency signals of the detecting coils 77, 79 and 81 are rectified with the diodes 83, 85 and 87 and the capacitors 84, 86 and 88. Thus, the three-phase voltages corresponding to the rotation of the position detecting rotor 75 are applied to the base terminals of the differential transistors 90, 91 and 92, respectively. The transistors 90, 91 and 92, having emitter terminals connected in common, operate differentially to one another according to the base voltages. Supposing that the base voltage of the transistor 90 becomes the largest, the transistor 90 becomes active and the other transistors 91 and 92 turn off. Thus, only the drive transistor 53 is activated so that the current is supplied only to the stator coil X.

Therefore, the drive transistors 53, 54 and 55 are activated sequentially according to the rotation of the position detecting rotor 75, and a continuous torque is obtained by selecting the current paths to the stator coils X, Y and Z from the DC-DC switching converter 52.

The current detector 94 comprising the current detecting resistor 93 detects the supply current to the stator coils X, Y and Z. The current controller 95 compares the detected current signal 96 with the command signal 60, and receives the current $I_e$ corresponding to the difference between the detected current signal 96 and the command signal 60. As the current $I_e$ is a base current of an activated drive transistor through the differential transistors 90, 91 and 92, the supply current to the stator coils X, Y and Z will correspond to the command signal 60.

As a result of the current feedback loop comprising the current detector 94, the current controller 95 and the drive transistors 53, 54 and 55, the variation of the supply current due to the $h_{FE}$ variation among the drive transistors 53, 54 and 55 is remarkably reduced.

The voltage controller 58 detects the voltage drops across the drive transistors 53, 54 and 55 in each activated period. The Zener diode 117, resistors 118, 119, 120 and the diode 116 produce another voltage from the output $V_c$ of the DC-DC switching converter 52. The produced voltage is smaller than the output $V_c$ by a predetermined voltage, usually 1 V to 5 V. This voltage is applied to the base terminals of the transistor 112.

On the other hand, the voltage drops across the drive transistors 53, 54 and 55 in each activated period is detected by diodes 107, 108 and 109 connected in common at their cathode, and applied to the base terminal of the transistor 111. The transistors 111 and 112 form a differential circuit which compares the base voltages of the both transistors. Therefore, the detected signal 59, corresponding to the difference between the voltage drops across the drive transistors and the predetermined voltage, is obtained at the collector resistor 113 of the transistor 111. The detected signal 59 is applied to the switching controllor 61 in the DC-DC switching converter 52.

The switching controller 61 comprises an oscillator, a sawtooth wave generator and a comparator, and produces a pulse train with a pulse width corresponding to the detected signal 7, for example. The switching controller 61 controls the on-time ratio of the switching transistor 100 according to the detected signal 59, and changes the output voltage $V_c$ of the DC-DC switching converter 52 so that the voltage drops across the drive transistors 53, 54 and 55 in each activated period can be equal to the predetermined value in the normal operating region.

Besides, reference numeral 115 is a constant current source from the DC voltage source 51, and reference numeral 116 is a diode for a reverse voltage protection of the transistor 112.

FIG. 7 is another circuit diagram for the brushless DC motor shown in FIG. 5 according to the present invention. The differences between this circuit and the preceding circuit shown in FIG. 6 are as follows:

(1) The voltage controller 58 detects only the voltage drop across the drive transistor 53 in its activated period.

(2) The voltage controller 58 has a voltage hold circuit 122 which is an RC time delay circuit comprising a resistor 110 and a capacitor 121.

When the drive transistor 53 turns activated, the diode 107 turns on, and the collector voltage of the drive transistor 53 is transferred to the capacitor 121. When the drive transistor 53 turns off, the diode 107 turns off, and the transferred voltage of the capacitor 121 decreases with a large time constant of the resistor 110 and the capacitor 121 so that the transferred voltage may be held till the next activated period of the drive transistor 53.

The operation of the circuit shown in FIG. 7 is substantially the same as that of the circuit shown in FIG. 6.

As described hereinbefore, a control system for a DC motor according to the present invention has many advantages as follows:

(1) The power efficiency is extremely high. Thus, it is particularly suitable for a variable speed control system or a variable torque control system.

(2) Switching noise is not produced except in the DC-DC switching converter. Accordingly, it is easy to shield for the switching noise.

(3) An excellent control for the DC motor can be achieved because of the precise power control for the actuating block by the drive transistor.

(4) The drive transistor can be reduced in its absolute maximum power handling capability and in its size.

As described hereinbefore, a control system suitable for a brushless DC motor according to the present invention has the same advantages as follows:

(1) The power efficiency is extremely high. Thus, it is especially suitable for a variable speed control system or a variable torque control system.

(2) Switching noise is not produced except in the DC-DC switching converter. Brush noise is not produced, either. Accordingly, it is easy to shield for the switching noise.

(3) An excellent control for the brushless DC motor can be achieved because of the precise power control for the stator coils by the drive transistors.

(4) The drive transistors can be reduced in their absolute maximum power handling capability and their size.

Furthermore, the control system for a brushless DC motor providing the current feedback loop as the preceding embodiment shown in FIG. 6 has other advantages as follows:

(1) The variation of the supply current to the stator coils is remarkably reduced among the stator coils. This reduces the torque variations and also the variation of the voltage drops.

(2) It becomes easy to detect the voltage drops across the drive transistors in each activated period because of the reduced variation of the supply current.

(3) The variation of the supply current due to the ripple voltage from the DC-DC switching converter is not produced.

(4) The variation of the torque is reduced.

Besides, the DC-DC switching converter can be not only a current booster shown in the previous embodiments, but also a voltage booster. A voltage booster is the DC-DC switching converter producing another voltage from a DC voltage source, the produced voltage being higher than the source voltage. The DC-DC switching converter of the voltage-booster type is particularly suitable for a DC voltage source such as a battery. An inverter control DC-DC switching converter or a chopper control DC-DC switching converter can be used in the previous embodiments. Furthermore, the DC-DC switching converter can change the output voltage not only continuously but also stepwisely.

Besides, the constructions of the DC motors are not limited by the previous embodiments. For example, an electro-magnetic transducer such as a Hall generator is usable for detecting the position of the permanent magnet rotor in the embodiment shown in FIG. 5 and FIG. 6.

What is claimed is:

1. A control system for a DC motor comprising:
   a permanent magnet rotor having a plurality of N and S poles;
   polyphase stator coils provided in the magnetic field of said permanent magnet rotor so as to generate polyphase alternate voltages according to the relative rotation between said permanent magnet rotor and said polyphase stator coils;
   a DC voltage source for supplying electric power;
   a DC-DC switching converter for producing another voltage from the voltage of said DC voltage source;
   drive transistors provided in the paths from said DC-DC switching converter to said polyphase stator coils;
   a distribution controller having a position detecting means for detecting the relative position between said permanent magnet rotor and said polyphase stator coils and for activating said drive transistors selectively in correspondence with said relative position, a current detector for detecting a supply current to said polyphase coils, and a current controller for controlling output currents of said drive transistors in each activated period so that current applied to said polyphase stator coils is controlled in correspondence with a command signal; and
   a voltage controller for detecting at least one of the voltage drops across said drive transistors in each activated period and for producing a detected signal which controls the output voltage of said DC-DC switching converter.

2. A control system for a DC motor according to claim 1 wherein said DC-DC switching converter has a switching semiconductor, the on-time ratio of which is controlled according to the output of said voltage controller.

3. A control system for a DC motor according to claim 1, wherein said voltage controller has a differential circuit for comparing at least one of the voltage drops across said drive transistors in each activated period with a predetermined value.

4. A control system for a DC motor according to claim 1, wherein said voltage controller has a voltage hold circuit which detects some of the voltage drops across said drive transistors in each activated period and holds the detected voltage until the next detecting period.

* * * * *